US010740407B2

(12) United States Patent
Mullins et al.

(10) Patent No.: US 10,740,407 B2
(45) Date of Patent: Aug. 11, 2020

(54) MANAGING INFORMATION ABOUT DOCUMENT-RELATED ACTIVITIES

(71) Applicant: Microsoft Technology Licensing, LLC, Redmond, WA (US)

(72) Inventors: Christopher Lee Mullins, Sammamish, WA (US); Joshua Allen Cowhig, Redmond, WA (US); Robert Earl Standefer, III, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 15/399,405

(22) Filed: Jan. 5, 2017

(65) Prior Publication Data

US 2018/0165284 A1 Jun. 14, 2018

Related U.S. Application Data

(60) Provisional application No. 62/432,397, filed on Dec. 9, 2016.

(51) Int. Cl.
*G06F 16/93* (2019.01)
(52) U.S. Cl.
CPC .................. *G06F 16/93* (2019.01)
(58) Field of Classification Search
CPC ......... G06F 17/30011; G06F 17/30572; G06F 17/30958; G06F 16/93
See application file for complete search history.

(56) References Cited

U.S. PATENT DOCUMENTS

| 6,324,551 B1 | 11/2001 | Lamping et al. |
| 6,356,922 B1 | 3/2002 | Schilit et al. |

(Continued)

FOREIGN PATENT DOCUMENTS

| EP | 2704445 A1 | 3/2014 |
| WO | 2006014727 A1 | 2/2006 |

(Continued)

OTHER PUBLICATIONS

Holzner, et al., "Google Docs 4 Everyone," In Publication of FT Press, Feb. 9, 2009, 2 pages.

(Continued)

*Primary Examiner* — Miranda Le
(74) *Attorney, Agent, or Firm* — Michael Best & Friedrich LLP

(57) ABSTRACT

A facility for managing information about document-related activities is described. In some cases, the facility uses particular kinds of structures to represent, in a document graph, document-related activities performed by particular users. In some cases, the facility uses these structures to enable one user to subscribe to the document-related activities performed by another user. In some cases, the facility uses these structures to aggregate document-related activities performed by users in a group of users, such as by aggregating topics that are addressed by documents that are the subject of these document-related activities. In some cases, the facility uses particular kinds of structures to represent, in a document graph, tasks that certain users either can help with or need help with. In some cases, the facility uses these structures to match users that can help with a task with users that need help with a task.

5 Claims, 18 Drawing Sheets

(56) References Cited

U.S. PATENT DOCUMENTS

| | | | |
|---|---|---|---|
| 6,421,691 B1 | 7/2002 | Kajitani | |
| 6,484,162 B1 | 11/2002 | Edlund et al. | |
| 6,558,431 B1 | 5/2003 | Lynch et al. | |
| 6,928,425 B2 | 8/2005 | Grefenstette et al. | |
| 7,039,597 B1 | 5/2006 | Notani et al. | |
| 7,103,609 B2 * | 9/2006 | Elder | G06F 16/9535 |
| 7,299,257 B2 | 11/2007 | Boyer et al. | |
| 7,334,195 B2 | 2/2008 | Gemmell et al. | |
| 7,389,473 B1 | 6/2008 | Sawicki et al. | |
| 7,395,501 B2 | 7/2008 | Graham et al. | |
| 7,437,330 B1 | 10/2008 | Robinson et al. | |
| 7,478,129 B1 * | 1/2009 | Chemtob | H04L 12/1827 |
| | | | 709/204 |
| 7,496,841 B2 | 2/2009 | Hadfield et al. | |
| 7,617,281 B2 | 11/2009 | Manion et al. | |
| 7,627,582 B1 | 12/2009 | Ershov | |
| 7,627,590 B2 | 12/2009 | Boguraev et al. | |
| 7,689,624 B2 | 3/2010 | Huang et al. | |
| 7,703,021 B1 * | 4/2010 | Flam | G06F 21/6227 |
| | | | 715/741 |
| 7,716,263 B2 | 5/2010 | Masek | |
| 7,752,204 B2 | 7/2010 | Kao et al. | |
| 7,818,678 B2 | 10/2010 | Massand | |
| 7,849,090 B2 | 12/2010 | Sweeney | |
| 7,865,494 B2 | 1/2011 | Best et al. | |
| 8,005,825 B1 | 8/2011 | Ghosh | |
| 8,005,835 B2 | 8/2011 | Walther et al. | |
| 8,060,820 B2 | 11/2011 | Bedi et al. | |
| 8,150,820 B1 * | 4/2012 | Herbach | G06F 21/604 |
| | | | 707/705 |
| 8,170,932 B1 | 5/2012 | Krakowiecki et al. | |
| 8,418,051 B1 | 4/2013 | Bourdev | |
| 8,458,196 B1 * | 6/2013 | Procopio | G06F 16/35 |
| | | | 707/749 |
| 8,515,816 B2 | 8/2013 | King et al. | |
| 8,538,967 B1 | 9/2013 | Wu et al. | |
| 8,554,800 B2 | 10/2013 | Goldentouch | |
| 8,577,911 B1 | 11/2013 | Stepinski et al. | |
| 8,615,713 B2 | 12/2013 | Sun et al. | |
| 8,682,973 B2 | 3/2014 | Kikin-Gil et al. | |
| 8,689,108 B1 | 4/2014 | Duffield et al. | |
| 8,825,711 B2 * | 9/2014 | Chan | G06F 16/9024 |
| | | | 707/798 |
| 8,930,400 B2 * | 1/2015 | Adamic | G06F 16/335 |
| | | | 707/781 |
| 8,938,669 B1 | 1/2015 | Cohen | |
| 8,996,985 B1 | 3/2015 | Johnston et al. | |
| 9,037,983 B1 | 5/2015 | Shmulevich et al. | |
| 9,043,695 B2 | 5/2015 | Saito | |
| 9,092,773 B2 | 7/2015 | Daly et al. | |
| 9,117,240 B2 * | 8/2015 | Vaynblat | G06Q 50/01 |
| 9,396,177 B1 * | 7/2016 | Kursun | G06F 17/2211 |
| 9,588,941 B2 | 3/2017 | Carrier et al. | |
| 9,626,455 B2 | 4/2017 | Miller et al. | |
| 9,710,129 B2 * | 7/2017 | Dunne | G06F 3/0481 |
| 9,792,583 B2 * | 10/2017 | Perreault | G06Q 10/10 |
| 2003/0167281 A1 | 9/2003 | Cohen et al. | |
| 2004/0013302 A1 | 1/2004 | Ma et al. | |
| 2004/0024739 A1 | 2/2004 | Copperman et al. | |
| 2004/0030697 A1 | 2/2004 | Cochran et al. | |
| 2004/0088315 A1 * | 5/2004 | Elder | G06F 16/38 |
| 2004/0194021 A1 | 9/2004 | Marshall et al. | |
| 2004/0255265 A1 * | 12/2004 | Brown | G06Q 10/06 |
| | | | 717/101 |
| 2004/0261016 A1 | 12/2004 | Glass et al. | |
| 2006/0026502 A1 | 2/2006 | Dutta | |
| 2007/0003166 A1 | 1/2007 | Berkner | |
| 2007/0165904 A1 | 7/2007 | Nudd et al. | |
| 2007/0220417 A1 | 9/2007 | Mathew et al. | |
| 2007/0294614 A1 | 12/2007 | Jacquin et al. | |
| 2008/0148159 A1 * | 6/2008 | Kogan | G06Q 10/06 |
| | | | 715/753 |
| 2008/0154886 A1 | 6/2008 | Podowski et al. | |
| 2008/0184101 A1 | 7/2008 | Joshi et al. | |
| 2008/0201632 A1 | 8/2008 | Hong et al. | |
| 2008/0263023 A1 | 10/2008 | Vailaya et al. | |
| 2008/0270406 A1 | 10/2008 | Flavin et al. | |
| 2008/0288859 A1 | 11/2008 | Yuan et al. | |
| 2009/0019353 A1 | 1/2009 | Abrams et al. | |
| 2009/0157572 A1 | 6/2009 | Chidlovskii | |
| 2009/0204465 A1 * | 8/2009 | Pradhan | G06Q 10/06 |
| | | | 705/7.17 |
| 2009/0249224 A1 | 10/2009 | Davis et al. | |
| 2010/0095198 A1 | 4/2010 | Bultrowicz et al. | |
| 2010/0312793 A1 | 12/2010 | Brown et al. | |
| 2011/0029521 A1 | 2/2011 | Thayne et al. | |
| 2011/0072355 A1 | 3/2011 | Carter et al. | |
| 2011/0082848 A1 | 4/2011 | Goldentouch | |
| 2011/0131211 A1 | 6/2011 | Harrington | |
| 2011/0178981 A1 | 7/2011 | Bowen et al. | |
| 2011/0179066 A1 | 7/2011 | Cardno et al. | |
| 2012/0143862 A1 * | 6/2012 | Jones | G06F 16/335 |
| | | | 707/732 |
| 2012/0159315 A1 | 6/2012 | Chakra et al. | |
| 2012/0179647 A1 | 7/2012 | Crucs | |
| 2012/0233150 A1 | 9/2012 | Naim et al. | |
| 2012/0254161 A1 | 10/2012 | Zhang et al. | |
| 2012/0311540 A1 | 12/2012 | Fanning et al. | |
| 2012/0323625 A1 * | 12/2012 | Lee | G06Q 10/06 |
| | | | 705/7.17 |
| 2013/0055074 A1 | 2/2013 | Trese et al. | |
| 2013/0080428 A1 * | 3/2013 | Wang | G06Q 10/10 |
| | | | 707/732 |
| 2013/0124515 A1 | 5/2013 | Ghimire | |
| 2013/0124546 A1 * | 5/2013 | Wormley | G06F 16/27 |
| | | | 707/758 |
| 2013/0159922 A1 | 6/2013 | Borkowski et al. | |
| 2013/0185252 A1 * | 7/2013 | Palmucci | G06F 16/93 |
| | | | 707/608 |
| 2013/0191451 A1 | 7/2013 | Tse et al. | |
| 2013/0205203 A1 | 8/2013 | Macdougall et al. | |
| 2013/0212250 A1 | 8/2013 | Kleppner et al. | |
| 2013/0254126 A1 | 9/2013 | Koenig et al. | |
| 2013/0262983 A1 | 10/2013 | Richter et al. | |
| 2013/0301953 A1 | 11/2013 | Montague | |
| 2013/0326330 A1 | 12/2013 | Harris et al. | |
| 2014/0013242 A1 | 1/2014 | Beresford-wood et al. | |
| 2014/0019562 A1 * | 1/2014 | Le Chevalier | G06F 17/241 |
| | | | 709/206 |
| 2014/0019854 A1 | 1/2014 | Alexander et al. | |
| 2014/0101527 A1 | 4/2014 | Suciu | |
| 2014/0122991 A1 | 5/2014 | Achillopoulos | |
| 2014/0229475 A1 | 8/2014 | Walsh | |
| 2014/0250377 A1 | 9/2014 | Bisca et al. | |
| 2014/0257894 A1 | 9/2014 | Melahn et al. | |
| 2014/0279893 A1 * | 9/2014 | Branton | G06F 16/904 |
| | | | 707/634 |
| 2014/0280377 A1 | 9/2014 | Frew | |
| 2014/0304618 A1 | 10/2014 | Carriero et al. | |
| 2014/0351687 A1 | 11/2014 | Hall | |
| 2014/0372417 A1 * | 12/2014 | Olson | G06Q 10/06 |
| | | | 707/722 |
| 2015/0039560 A1 * | 2/2015 | Barker | G06F 16/93 |
| | | | 707/626 |
| 2015/0082196 A1 | 3/2015 | Berger et al. | |
| 2015/0169755 A1 | 6/2015 | Cierniak et al. | |
| 2015/0213631 A1 | 7/2015 | Vander Broek | |
| 2015/0269153 A1 * | 9/2015 | Fink | G06F 16/24578 |
| | | | 707/750 |
| 2015/0302063 A1 | 10/2015 | Nigam et al. | |
| 2015/0339282 A1 | 11/2015 | Goyal | |
| 2015/0363702 A1 | 12/2015 | Baum | |
| 2015/0370769 A1 | 12/2015 | Pereira filho et al. | |
| 2016/0034567 A1 | 2/2016 | Miller et al. | |
| 2016/0041959 A1 | 2/2016 | Beckley et al. | |
| 2016/0132613 A1 * | 5/2016 | Obbard | G06F 16/248 |
| | | | 707/798 |
| 2016/0232567 A1 * | 8/2016 | Vaynblat | G06Q 50/01 |
| 2016/0344828 A1 | 11/2016 | Hausler et al. | |
| 2016/0372079 A1 | 12/2016 | Ku | |
| 2017/0075862 A1 | 3/2017 | Kumar | |
| 2017/0220546 A1 | 8/2017 | Codrington et al. | |

(56) References Cited

U.S. PATENT DOCUMENTS

| | | | |
|---|---|---|---|
| 2017/0251072 | A1 | 8/2017 | Rinehart et al. |
| 2017/0300481 | A1 | 10/2017 | Mullins et al. |
| 2018/0025303 | A1 | 1/2018 | Janz |
| 2018/0165554 | A1 | 6/2018 | Zhang et al. |

FOREIGN PATENT DOCUMENTS

| | | |
|---|---|---|
| WO | 2013085699 A1 | 6/2013 |
| WO | 2015036817 A1 | 3/2015 |

OTHER PUBLICATIONS

"Chat User Manual," Retrieved on: Sep. 22, 2016 Available at: https://support.cometchat.com/documentation/wp-content/uploads/sites/2/2013/03/End-user-manual-Premium-Edition.pdf.

Reynolds, Michael, "How to Collaborate With Google Docs", Published on: May 23, 2013 Available at: https://blog.spinweb.net/how-to-collaborate-with-google-docs.

"Document collaboration and co-authoring," Retrieved on: Aug. 16, 2016 Available at: https://support.office.com/en-us/article/Document-collaboration-and-co-authoring-ee1509b4-1f6e-401e-b04a-782d26f564a4.

Carroll, et al., "Notification and Awareness: Synchronizing task-oriented collaborative activity", In International Journal of Human Computer Studies, vol. 58, No. 5, May 2003, pp. 1-26.

Hayashi, et al., "Activity Awareness: A Framework for Sharing Knowledge of People, Projects, and Places", In Proceedings of the Sixth European Conference on Computer-Supported Cooperative Work, Sep. 12, 1999, pp. 99-118.

Morán, et al., "Document Presence Notification Services for Collaborative Writing", In Proceedings of the Seventh International Workshop on Groupware, Sep. 6, 2001, pp. 125-133.

Hoffman, Chris, "How to Collaborate on Documents Over the Internet", Published on: Feb. 23, 2014 Available at: http://www.howtogeek.com/183176/how-to-collaborate-on-documents-over-the-internet/.

"Collaborative Document Editing", Published on: Apr. 7, 2016 Available at: https://helpcenter.onlyoffice.com/onlyoffice-editors/onlyoffice-document-editor/helpfulhints/collaborativeediting.aspx.

"Document collaboration and co-authoring," Retrieved on: Aug. 8, 2016 Available at: https://support.office.com/en-us/article/Document-collaboration-and-co-authoring-ee1509b4-1f6e-401e-b04a-782d26f564a4.

"Work together on Office documents in OneDrive," Published on: Oct. 31, 2014 Available at: https://support.office.com/en-us/article/Work-together-on-Office-documents-in-OneDrive-ea3807bc-2b73-406f-a8c9-a493de18258b.

Simultaneously edit a document with other authors, Retrieved on: Aug. 5, 2016 Available at: https://support.office.com/en-us/article/Simultaneously-edit-a-document-with-other-authors-2a6059e7-9fe9-4e66-8ecd-f3d5372c27f4.

"Doc Collaboration," Published on: Sep. 27, 2011 Available at: https://apihelp.wiki.zoho.com/Doc-Collaboration.html.

"Overview of co-authoring in SharePoint 2013," Retrieved on: Aug. 5, 2016 Available at: https://technet.microsoft.com/en-IN/library/ff718249.aspx.

Laskaris, John, "Planning Collaboration Activities," Published on: Nov. 2015 Available at: https://www.efrontlearning.com/blog/2015/11/planning-collaboration-activities.html.

"Allow changes to parts of a protected document", Available at: https://support.office.com/en-us/article/Allow-changes-to-parts-of-a-protected-document-187ed01c-8795-43e1-9fd0-c9fca419dadf, May 16, 2016, 6 Pages.

"Heat Maps", Available at: http:I/tag.microsoft.com/what-is-tag/reporting-tools/heat-maps.aspx, Sep. 28, 2015, 1 Page.

"How to Create an Interactive Heat Map in Excel", Available at: https://www.youtube.com/watch?v=L_VgdPZgpZV, Sep. 28, 2015, 2 Pages.

"How to: Restrict editing specific sections", Available at: https://social.msdn.microsoft.com/Forums/office/en-US/b8c05793-c30c-4bb2-ad71-fbdd62e58d86/how-to-restrict-editing-specific-sections?forum=worddev, May 16, 2016, 2 Pages.

"Microsoft Motion", Available at:Blogs.microsoft.co.il/files/folders/2034/download.aspx, Sep. 23, 2015, 19 Pages.

"Partially restrict formatting and editing specific parts of a word (Office 2010) document", Available at: https://social.technet.microsoft.com/Forums/office/en-US/08fdfd9e-e354-4ed0-a7ce-f4f467cb00f4/partially-restrict-formatting-and-editing-specific-parts-of-a-word-office-2010-document forum=officeitproprevious, 5 Pages.

"Using Code Coverage to Determine How Much Code is Being Tested", Available at: https://msdn.microsoft.com/en-usllibrary/dd537628.aspx, Oct. 14, 2015, 9 Pages.

"Final Office Action Issued in U.S. Appl. No. 14/971,937", dated Feb. 28, 2018, 22 Pages.

"Non Final Office Action Issued in U.S. Appl. No. 14/971,937", dated Aug. 28, 2017, 20 Pages.

"Final Office Action Issued in U.S. Appl. No. 15/232,232", dated Dec. 20, 2017, 13 Pages.

"Non Final Office Action Issued in U.S. Appl. No. 15/232,232", dated Jul. 28, 2017, 13 Pages.

Birk, Chris, "The Madison Project—An Open Source Document Editing Tool Supporting Commenting, Sharing, and Collaboration", Available at: https://github.com/opengovfoundation/the-madison-project, Jul. 8, 2014, 5 Pages.

Brundritt, Ricky, "How to Create Heat Maps in Native Windows Store Apps", Available at: http://blogs.msdn.com/b/bingdevcenter/archive/2014/03/11/heat-maps-in-windows-store-apps.aspx, Mar. 11, 2014, 4 Pages.

Latif, Lawrence, "Microsoft Brings Heat Maps to Windows 8 Task Manager", Available at: http:/lwww.theinquirer.netlinquirer/news/2117437/microsoft-brings-heat-maps-windows-task-manager, Oct. 14, 2011, 4 Pages.

Papadopoulou, et al., "How a Structured Document Model Can Support Awareness in Collaborative Authoring", In Proceedings of the International Conference on Collaborative Computing: Networking, Applications and Worksharing, Nov. 12, 2007, 10 Pages.

Pawlowicz, et al., "Easy Heat Maps from Spreadsheet Data with OpenHeatMap", Available at: http://freegeographytools.com/2010/easy-heat-maps-from-spreadsheet-data-with-openheatmap, Sep. 23, 2015, 5 Pages.

"Invitation to Pay Additional Fee Issued in PCT Application No. PCT/US17/064388", dated Feb. 19, 2018, 5 Pages.

"International Preliminary Report on Patentability Issued in PCT Application No. PCT/US2016/065474", dated Mar. 13, 2018, 6 Pages.

"International Search Report and Written Opinion Issued in PCT Application No. PCT/US2016/065474", dated Mar. 29, 2017, 10 Pages.

"Second Written opinion Issued in PCT Application No. PCT/US2016/065474", dated Nov. 27, 2017, 5 Pages.

"International Search Report and Written opinion Issued in PCT Application No. PCT/US2017/027388", dated Jul. 12, 2017, 13 Pages.

"International Search Report and Written Opinion Issued in PCT Application No. PCT/US2017/044999", dated Oct. 12, 2017, 14 Pages.

Sarin, et al., "A Process Model and System for Supporting Collaborative Work", In Proceedings of the ACM SIGOIS Bulletin, vol. 12, No. 2-3, Nov. 1991, pp. 213-224.

Xu, et al., "GooRaph: Document Visualization of Search Results", Available at:http:/lwww.leeds.ac.uklevie/workpackages/wp5/EDV09_WP5_PR01_v2.1_DocVizOfSearchResults.pdf, Dec. 24, 2014, 8 Pages.

"Non Final Office Action issued in U.S. Appl. No. 15/098,240", dated Jan. 2, 2019, 19 Pages.

"Final Office Action Issued in U.S. Appl. No. 15/098,240", dated May 22, 2019, 15 Pages.

"Non Final Office Action Issued in U.S. Appl. No. 15/098,240", dated Nov. 8, 2019, 16 Pages.

(56) References Cited

OTHER PUBLICATIONS

"Final Office Action Issued in U.S. Appl. No. 15/098,240", dated Mar. 11, 2020, 14 Pages.

* cited by examiner document interactions — 700

| user | document | portion |
|---|---|---|
| Alice | Hartford Presentation | slide 1 | — 711
| Alice | Hartford Presentation | slide 2 | — 712
| Alice | Smith Memo | page 6 | — 713
| Alice | Smith Memo | page 7 | — 714
| Betty | Hartford Presentation | slide 3 | — 715
| Cameron | Jones Report | page 21 | — 716
| Cameron | Jones Report | page 22 | — 717
| Cameron | Jones Report | page 23 | — 718
| Davina | Jones Report | page 22 | — 719
| Erica | Marketing Plan | summary | — 720
| Florence | 2016Q4 Budget | narrative | — 721
| Florence | Jones Report | page 22 | — 722

701    702    703

*FIG. 7* document topics — 800

| document | portion | topic |
|---|---|---|
| Hartford Presentation | slide 1 | quality of service |
| Hartford Presentation | slide 1 | market inversion |
| Hartford Presentation | slide 2 | market inversion |
| Hartford Presentation | slide 3 | return to fundamentals |
| Smith Memo | page 6 | market inversion |
| Smith Memo | page 7 | political climate |
| Jones Report | page 21 | political climate |
| Jones Report | page 22 | return to fundamentals |
| Jones Report | page 23 | professional ethics |
| Jones Report | page 23 | market inversion |
| Marketing Plan | summary | social media advertising |
| 2016Q4 Budget | narrative | market inversion |

| user | topic | |
|---|---|---|
| | | ← 900 user topics |
| Alice | quality of service | ← 911 |
| Alice | market inversion | ← 912 |
| Alice | political climate | ← 913 |
| Betty | return to fundamentals | ← 914 |
| Cameron | political climate | ← 915 |
| Cameron | return to fundamentals | ← 916 |
| Cameron | professional ethics | ← 917 |
| Davina | return to fundamentals | ← 918 |
| Erica | social media advertising | ← 919 |
| Florence | market inversion | ← 920 |
| Florence | return to fundamentals | ← 921 |
| ↑ 901 | ↑ 902 | |

FIG. 9

| topic | number of users |
|---|---|
| return to fundamentals | 4 |
| market inversion | 2 |
| political climate | 2 |
| professional ethics | 1 |
| quality of service | 1 |
| social media advertising | 1 | topic frequency ⟋ 1000

Offer Assistance with Tasks

Select task type:
- ⦿ English to French translation — 1411
- ○ visual style review — 1412
- ○ create transitions between slides — 1413

[Submit] — 1420

*FIG. 14*

Seek Assistance with Task

Select task type:
- ● English to French translation — 1611
- ○ visual style review — 1612
- ○ create transitions between slides — 1613

(1610)

Specify minimum qualifications required:
- ○ Elementary proficiency in French language — 1621
- ○ Limited working proficiency in French language — 1622
- ● Minimum professional proficiency in French language — 1623
- ○ Full Professional proficiency in French language — 1624
- ○ Native of Bilingual proficiency in French language — 1625

(1620)

[Submit] — 1630

*FIG. 16*

MANAGING INFORMATION ABOUT DOCUMENT-RELATED ACTIVITIES

CROSS-REFERENCE TO RELATED APPLICATIONS

This application claims the benefit of U.S. Provisional Patent Application No. 62/432,397 filed on Dec. 9, 2016, which is hereby incorporated by reference in its entirety. In any cases where this application and the application incorporated by reference diverge, this application controls.

BACKGROUND

Electronic documents can contain content such as text, spreadsheets, slides, diagrams, charts, and images. Electronic documents can be the subject of a variety of activities, performed by a variety of people. These can include, for example: authoring a document, proposing edits to a portion of a document, commenting on those edits, providing feedback on a portion of a document, reading at least part of a document, etc.

Some conventional document collaboration tools permit multiple users to actively edit a single document at the same time. While this is occurring, some such tools display to each participating user (1) the identities of the other participating users, and (2) the edits presently being made to the document by each of the participating users.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for managing information about document-related activities is described. In some cases, the facility uses particular kinds of structures to represent, in a document graph, document-related activities performed by particular users. In some cases, the facility uses these structures to enable one user to subscribe to the document-related activities performed by another user. In some cases, the facility uses these structures to aggregate document-related activities performed by users in a group of users, such as by aggregating topics that are addressed by documents that are the subject of these document-related activities. In some cases, the facility uses particular kinds of structures to represent, in a document graph, tasks that certain users either can help with or need help with. In some cases, the facility uses these structures to match users that can help with a task with users that need help with a task.

BRIEF DESCRIPTION OF THE DRAWINGS

FIG. 7 is a table diagram showing document portions identified as having been recently interacted with by a user of the group by the facility in act 603 shown in FIG. 6.

FIG. 8 is a table diagram showing the topics of document portions identified as having been recently interacted with by a user of the group by the facility in act 605 shown in FIG. 6.

FIG. 9 is a table diagram showing the topics of one or more document portions recently interacted with by a user of the group.

FIG. 10 is a table diagram showing the frequency of topics among users of the group

FIG. 14 is a display diagram showing a sample display presented by the facility in some embodiments to enable an offering user to offer assistance with a particular type of task.

FIG. 16 is a display diagram showing a sample display presented by the facility in some embodiments to enable a seeking user to seek assistance with a particular task.

DETAILED DESCRIPTION

Figure 1:
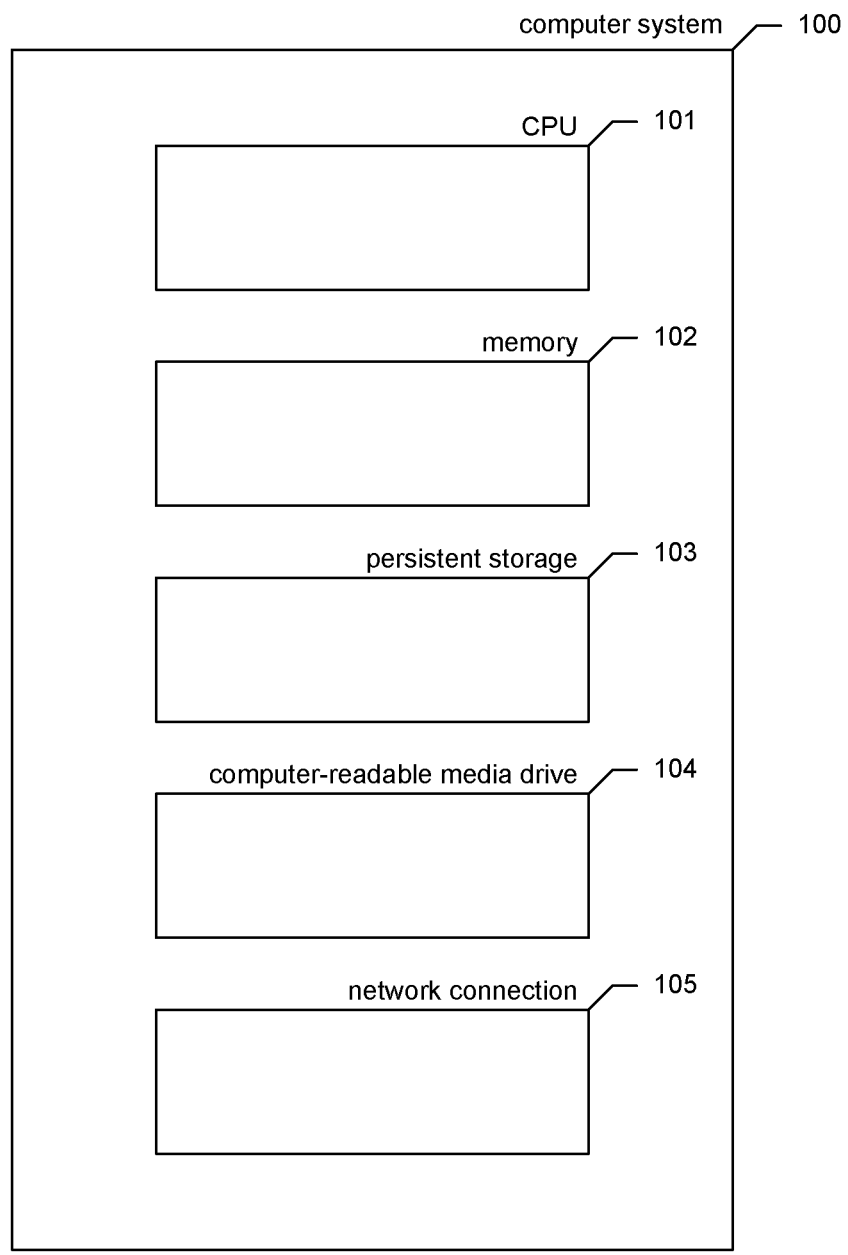
FIG. 1 is a block diagram showing some of the components typically incorporated in at least some of the computer systems and other devices on which the facility operates.

The inventors have recognized that conventional approaches to storing and communicating information about activities performed with respect to electronic documents (hereafter simply "documents") are so limited as to make it difficult or impossible to derive value from this information. They have further recognized that conventional document collaboration tools fail to provide helpful mechanisms for finding qualified people to perform necessary document-related tasks, such as proofreading, natural language translation, harmonizing the visual style of documents to design guides, creating inter-slide transitions in slideshows, drawing an illustration, producing a chart or graph, etc.

In response to this recognition, the inventors have conceived and reduced to practice a software and/or hardware facility ("the facility") for managing information about document-related activities.

In some embodiments, the facility performs such management in connection with one or more document graphs in which document content and document and user metadata is represented by a network of nodes connected by edges, which may be directional. In some such document graphs, documents or portions of documents are represented by document nodes and document portion nodes, respectively. For example, a slideshow presentation document may be represented by a document node, which is connected to four document portion nodes that each represent a slide in the slideshow presentation by four hasSlide edges. Users are each represented by a user node. When a user is working on a document or document portion, the user's user node is connected to the corresponding document node or document portion node by a workingOn edge. For example, the fact that a user Alice is working on the second slide of the slideshow presentation is reflected by an edge that connects Alice's user node to the document portion node representing the second slide of the slideshow presentation.

In some embodiments, the facility uses particular kinds of structures to represent, in a document graph, document-related activities performed by particular users. In particular, the facility uses a user presence node connected to each user's user node by an activityOn edge to represent that user's document-related activities. In some embodiments, the facility enables a first user to learn of a second user's document-related activities by "subscribing to" the second user's document-related activities. When the first user chooses to subscribe to the second user's document-related activities, the facility establishes a subscribesTo edge from the first user's user node to the second user's user presence node. For example, when a user Cameron subscribes to Alice's document-related activities, the facility establishes a subscribesTo edge from Cameron's user node to Alice's user presence node. As a result, Cameron is notified that Alice is working on the second side of the slideshow presentation. In some embodiments, the facility controls who may subscribe to a particular user's document-related activities, which activities they may receive information about, etc. in some cases, this control by the facility is based upon input from the user performing activities. In some embodiments, the facility represents document-related activities performed by particular users using presence entities other than presence nodes.

In some embodiments, the facility uses user presence nodes and activityOn edges to aggregate document-related activities performed by users in a group of users, such as by aggregating topics that are addressed by documents that are the subject of these document-related activities. For example, the graph may reflect that a group of users who work on the business strategy team has recently interacted with documents addressed mostly to the topics of "market inversion," "political climate," and "return to fundamentals." In response to determining this, the facility can generate a report identifying these topics as presently significant to this group of users.

In some embodiments, the facility uses particular kinds of structures to represent, in a document graph, tasks that certain users either can help with or need help with. In some embodiments, the facility uses these structures to match users that can help with a task with users that need help with a task. In particular, a user seeking assistance with a task can identify it to the facility. In response, the facility creates a task node representing the task, and connects the seeking user's user node to the new task node using a needHelpWith edge. In response to the creation of the needHelpWith edge entering the task node, the facility identifies canHelpWith edges in the graph entering task type nodes that correspond to the new task node; each of these canHelpWith edges represents the ability of the offering user whose user node the edge exits to help with tasks of the type identified by the task type node. The facility then matches the seeking user with one or more of the offering users. In some embodiments, the seeking user can establish qualifications used by the facility to filter the offering users with which the seeking user will be matched. For example, a seeking user may seek assistance with an English to French translation task, specifying that the user who performs the task must at least have Minimum professional proficiency in French Language. In response, the facility creates a task node for the English to French translation task that specifies this minimum qualification. The facility goes on to identify two canHelpWith edges entering a task type node representing an English to French translation task type. The facility examines the two user nodes that these edges exit, and determines that Simon's user node is connected by a hasQualification edge to a qualification node indicating that he has a French language proficiency level below the specified minimum qualification, while Tom's user node is connected by a hasQualification edge to a qualification node indicating that he has a French language proficiency level above the specified minimum qualification. Accordingly, the facility matches the seeking user with Tom.

By performing in some or all of these ways, the facility makes it easy for users to learn and act on the current and recent document-related activities being performed by single users and/or groups of users. Further, the facility greatly facilitates the matching of users that can perform document-related tasks with users that need these tasks performed.

Also, by performing in some or all of the ways described above and storing, organizing, and accessing information relating to a document graph in an efficient way, the facility meaningfully reduces the hardware resources needed to store and exploit this information, including, for example: reducing the amount of storage space needed to store the information relating to the document graph; and reducing the number of processing cycles needed to store, retrieve, or process the information relating to the document graph. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to a graph database with less latency, producing a better user experience and allowing users to do a particular amount of work in less time.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
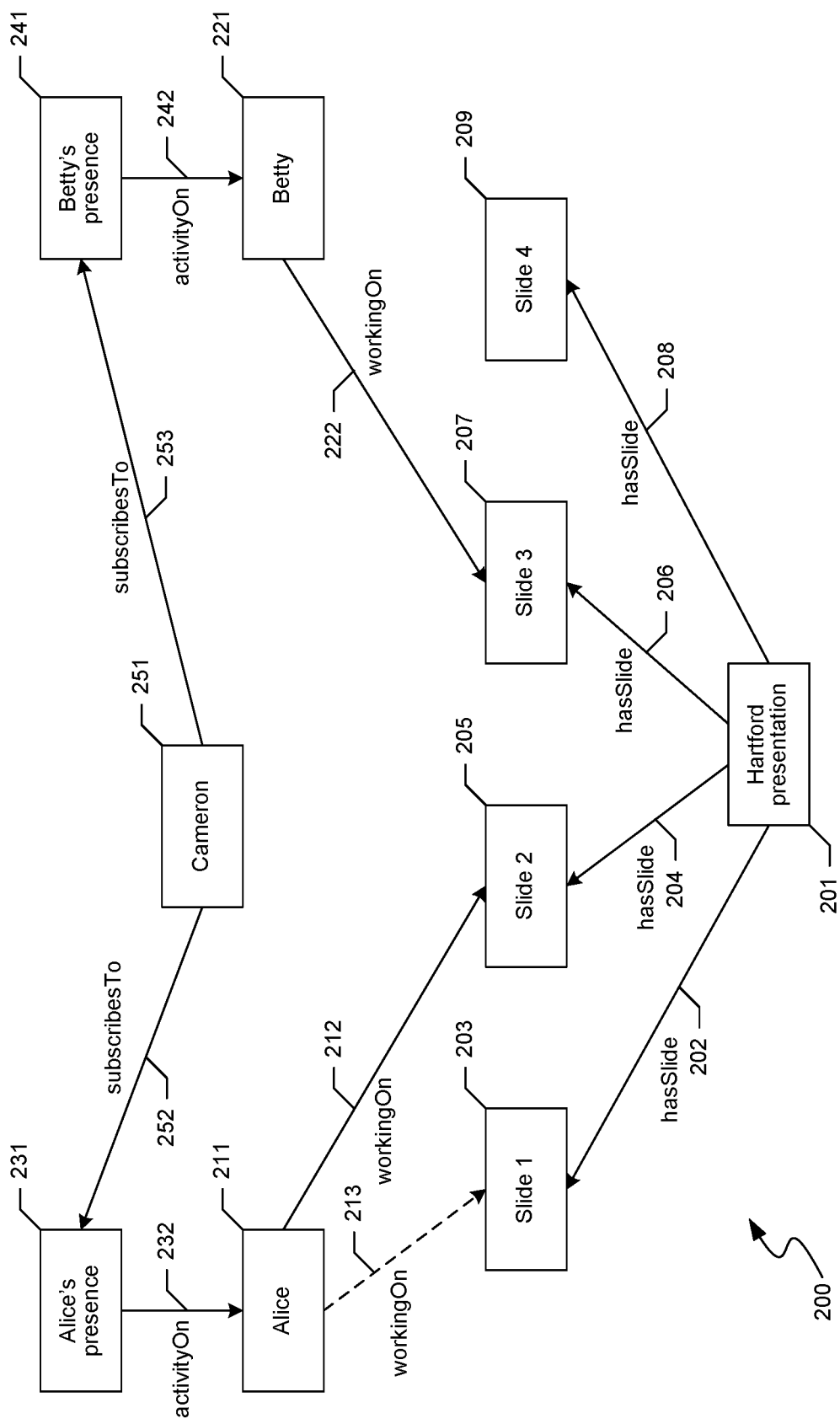
FIG. 2 is a graph diagram showing a sample document graph in which the facility represents the document-related activities of users.

FIG. 2 is a graph diagram showing a sample document graph in which the facility represents the document-related activities of users. The graph 200 includes user nodes for three users: user node 211 for Alice, user node 221 for Betty, and user node 251 for Cameron. The graph further includes nodes relating to a Hartford presentation document: a document node 201 representing the presentation, and document portion nodes 203, 205, 207, and 209, each representing one slide from the presentation. The document node is connected to these document portion nodes by hasSlide edges 202, 204, 206, and 208.

The workingOn edge 212 from Alice's user node 211 to the document portion node 205 for the second slide of the presentation indicates that Alice is presently working on this slide. The historical workingOn edge 213 from Alice's user node 211 to the document portion node 203 for the first slide of the presentation, shown with a broken line, indicates that Alice formerly worked on this slide.

The graph also includes a subscribesTo edge 252 from Cameron's user node 251 to Alice's presence node 231, established by the facility in response to Cameron's request to subscribe to Alice's document-related activities. Because of this subscribesTo edge, the facility informs Cameron that Alice is working on the second side of the presentation, as shown, for example, in FIG. 5 discussed below. In some embodiments, the subscription gives Cameron access to some or all of Alice's recent or other past document-related activities, such as her work on the first slide of the presentation. Similarly, in response to the subscribesTo edge 253 from Cameron's user node 251 to Betty's presence node 241, the facility informs Cameron that Betty is working on the third side of the presentation.

In various embodiments, the facility conveys this information about a user's document-related activity in various ways, such as: displaying it in a document management application, a document creation application, a document revision application, or an application of another kind; displaying it on a webpage; sending it in an email message, a text message, an SMS message, or a message of another type; rendering it in speech, such as by rendering it directly via an audio output device, rendering it in a phone call, rendering it in a voicemail message, or in another form; etc.

Figure 3:
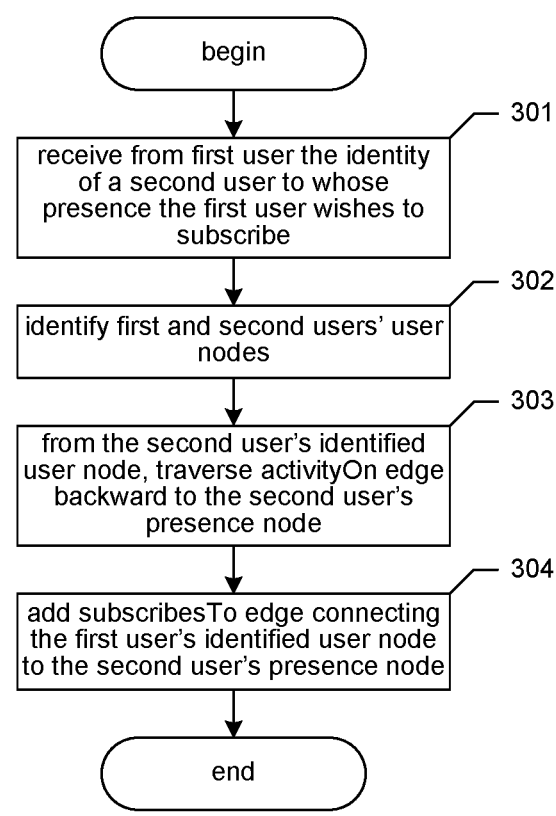
FIG. 3 is a flow diagram showing a process performed by the facility in some embodiments to create a subscription to a user's document-related activity.
Figure 5:
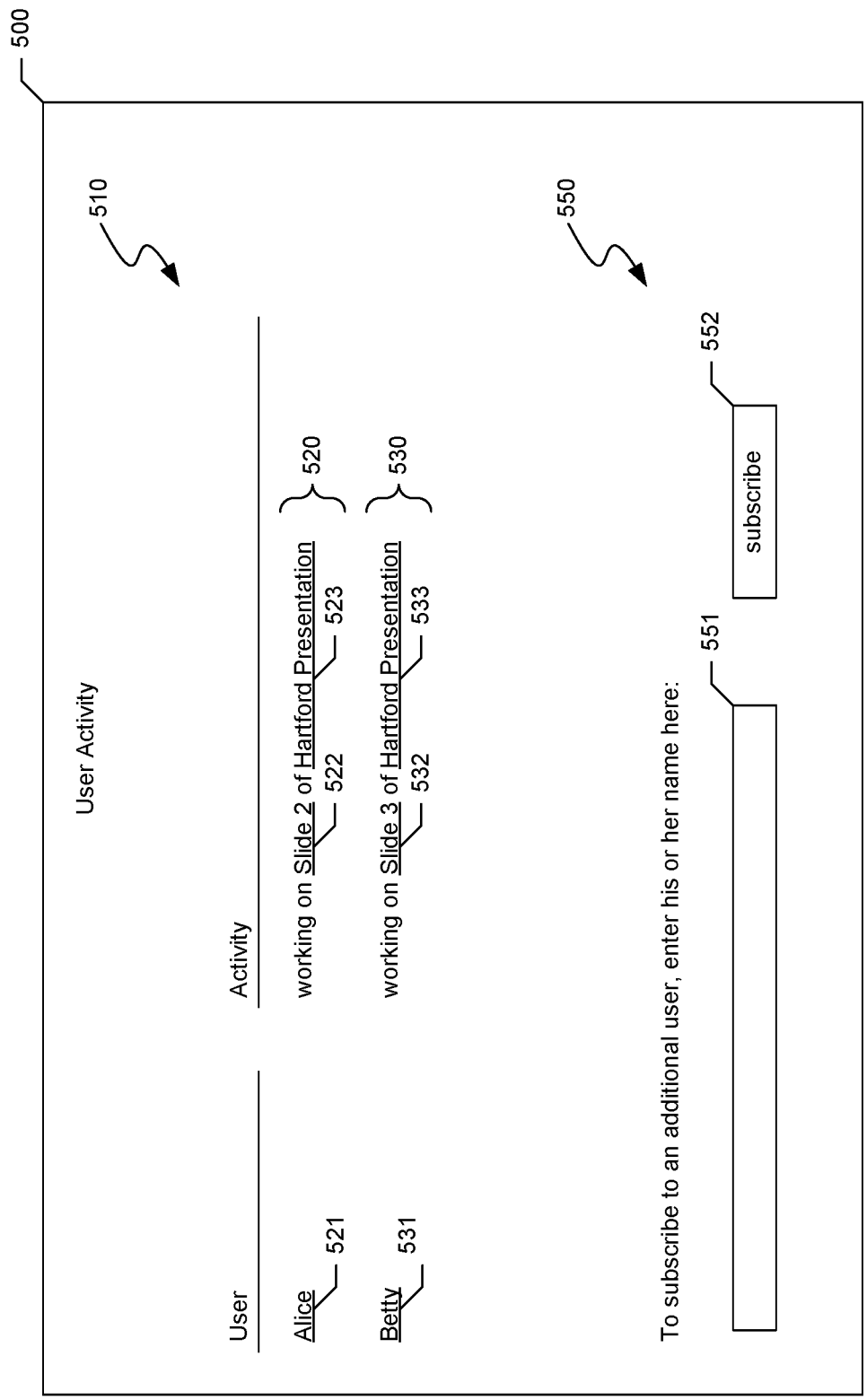
FIG. 5 is a display diagram showing a sample display presented by the facility in some embodiments to notify a user in accordance with his or her subscription to another user's document-related activity

FIG. 3 is a flow diagram showing a process performed by the facility in some embodiments to create a subscription to a user's document-related activity. In act 301, the facility receives from a first user the identity of a second user to whose presence the first user wishes to subscribe. Details relating to act 301 are shown in FIG. 5 and discussed below. In act 302, the facility identifies the user nodes of the first and second users, such as Cameron's user node 251 and Alice's user node 211 shown in FIG. 2. In act 303, from the second user's identified user node, the facility traverses the activityOn edge backward to the second user's presence node, such as traversing activityOn edge 232 backward from Alice's user node 211 to Alice's presence node 231. In act 304, the facility adds a subscribesTo edge connecting the first user's identified user node to the second user's presence node, such as by adding subscribesTo edge 252 from Cameron's user node 251 to Alice's presence node 231. This process then concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
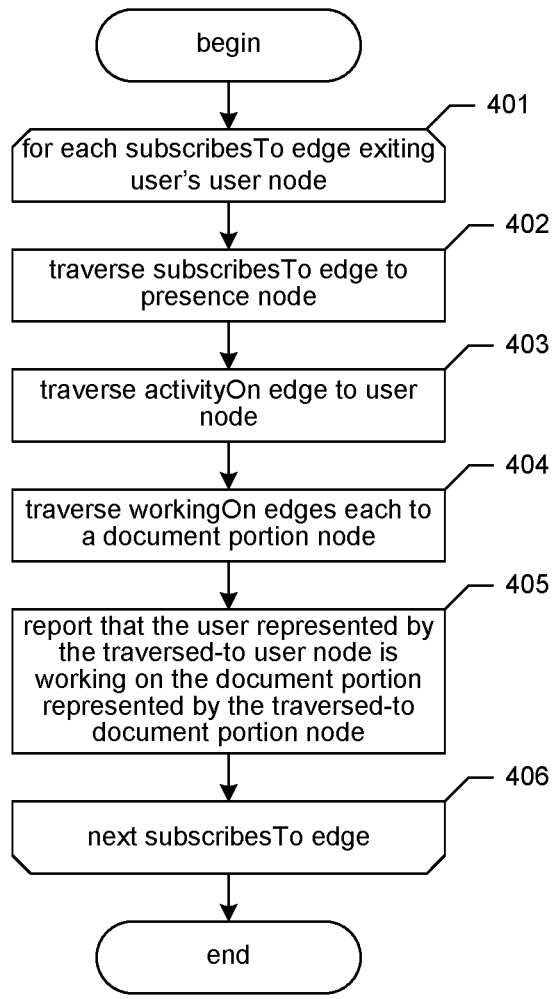
FIG. 4 is a flow diagram showing a process performed by the facility in some embodiments to notify a user in accordance with his or her subscription to another user's document-related activity.

FIG. 4 is a flow diagram showing a process performed by the facility in some embodiments to notify a user in accordance with his or her subscription to another user's document-related activity. In acts 401-406, the facility loops through each subscribesTo edge exiting the user node representing the user, such as, for Cameron, looping through each of subscribesTo edge 252 and subscribesTo edge 253 shown in FIG. 2, which both exit Cameron's user node 251. In act 402, the facility traverses the current subscribesTo edge to another user's presence node, such as by traversing subscribesTo edge 252 to Alice's presence node 231. In act 403, the facility traverses an activityOn edge from the user node traversed-to in act 402 to the user node of the user associated with the traversed-to presence node, such as by traversing activityOn edge 232 from Alice's presence node 231 to Alice's user node 211. In act 404, the facility traverses each workingOn edge that exits the user node traversed-to in act 403 to a document or document portion node representing a document or document portion being worked on by the user associated with the traversed-to user node, such as traversing workingOn edges 212 and 213 from Alice's user node 211 to document portion nodes 205 and 203 representing the second and first slides of the presentation. In act 405, the facility reports that the user represented by the user node traversed-to in act 403 is working on a document or document portion represented by the document or document portion node or nodes traversed-to in act 404. Details relating to act 405 are shown in FIG. 5 and discussed below. In act 406, if additional subscribesTo edges remain to be processed, then the facility continues in act 401 to process the next subscribesTo edge, else this process concludes.

FIG. 5 is a display diagram showing a sample display presented by the facility in some embodiments to notify a user in accordance with his or her subscription to another user's document-related activity. The display 500 includes a first area 510 listing the users to whose document-related activities this user (Cameron) has subscribed, Alice 521 and Betty 531. The first area 510 further lists, for each of these subscribed-to users, their current—and in some cases recent or other past—document-related activities 520 and 530. As shown, the references 522 and 532 to the second and third slides of the presentation and the references 523 and 533 to the presentation are links that the user can follow in order to access these document portions and this document, such as by displaying them, printing them, revising them, displaying a representation of revisions to them, etc.

The display 500 also has a second area 520, containing a field 550 into which the user can enter the name of another user (or other information about that user) and operate a subscribed control 552 in order to subscribe to the document-related activity of another user.

Figure 6:
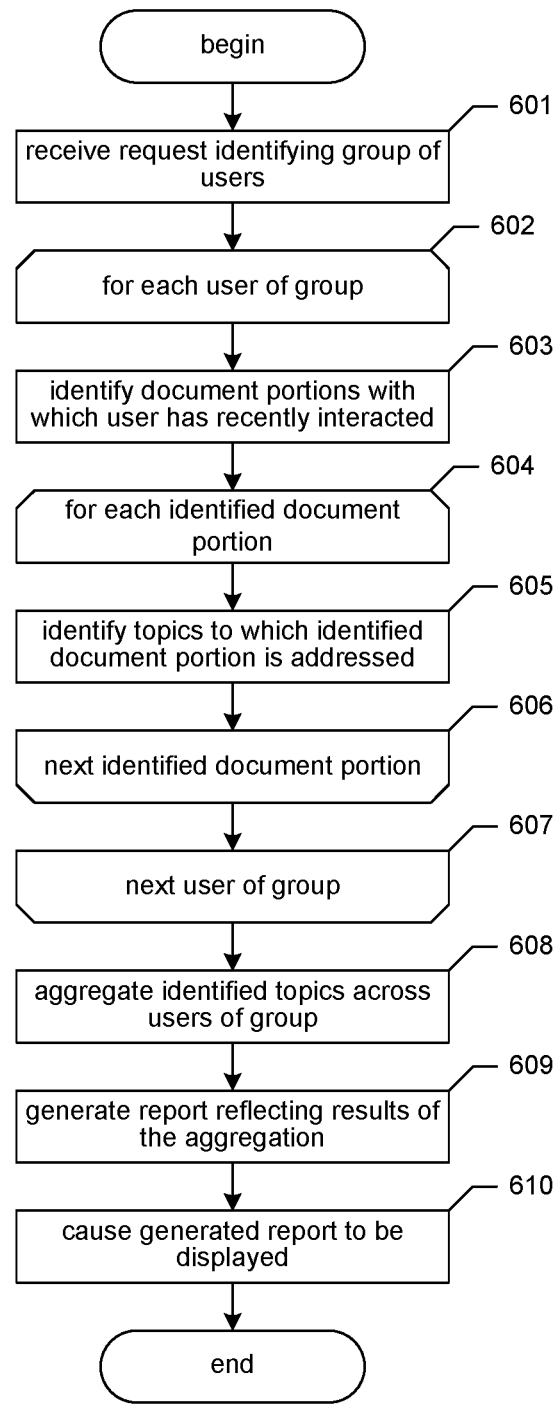
FIG. 6 is a flow diagram showing a process performed by the facility in some embodiments to aggregate the document-related activity of a group of users
Figure 11:
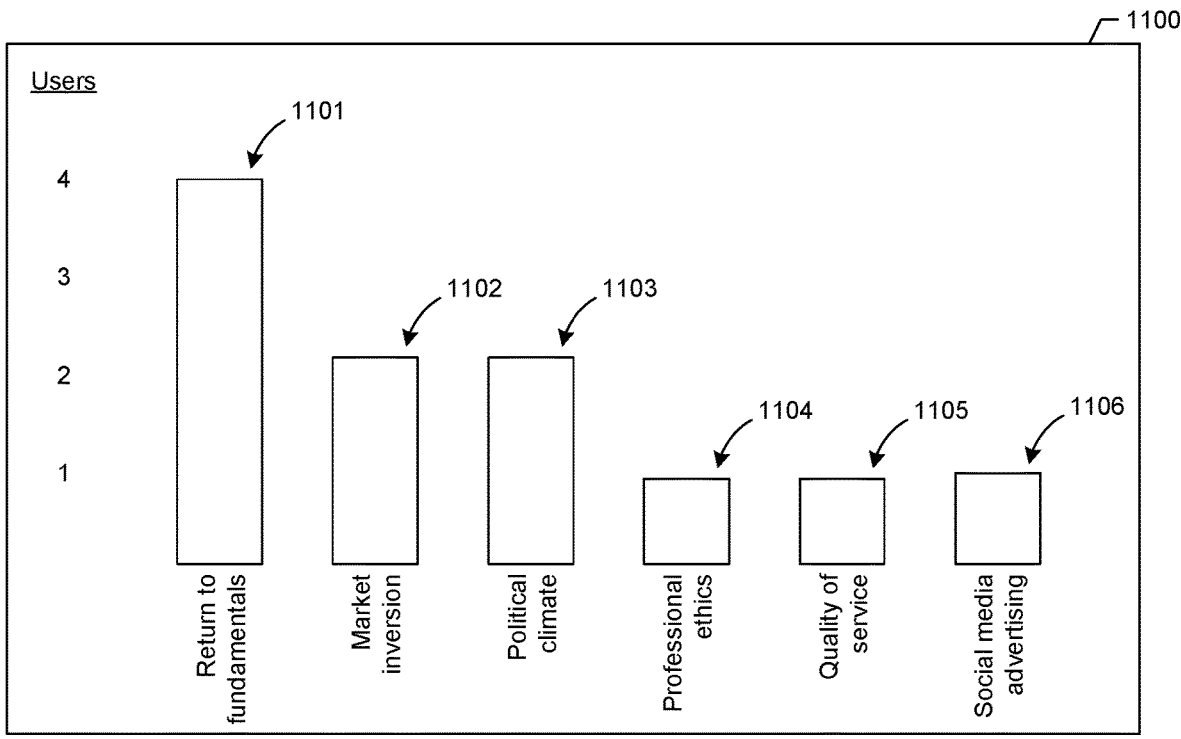
FIG. 11 is a display diagram showing a sample histogram report generated by the facility based upon the topic frequency data shown in FIG. 10.
Figure 12:
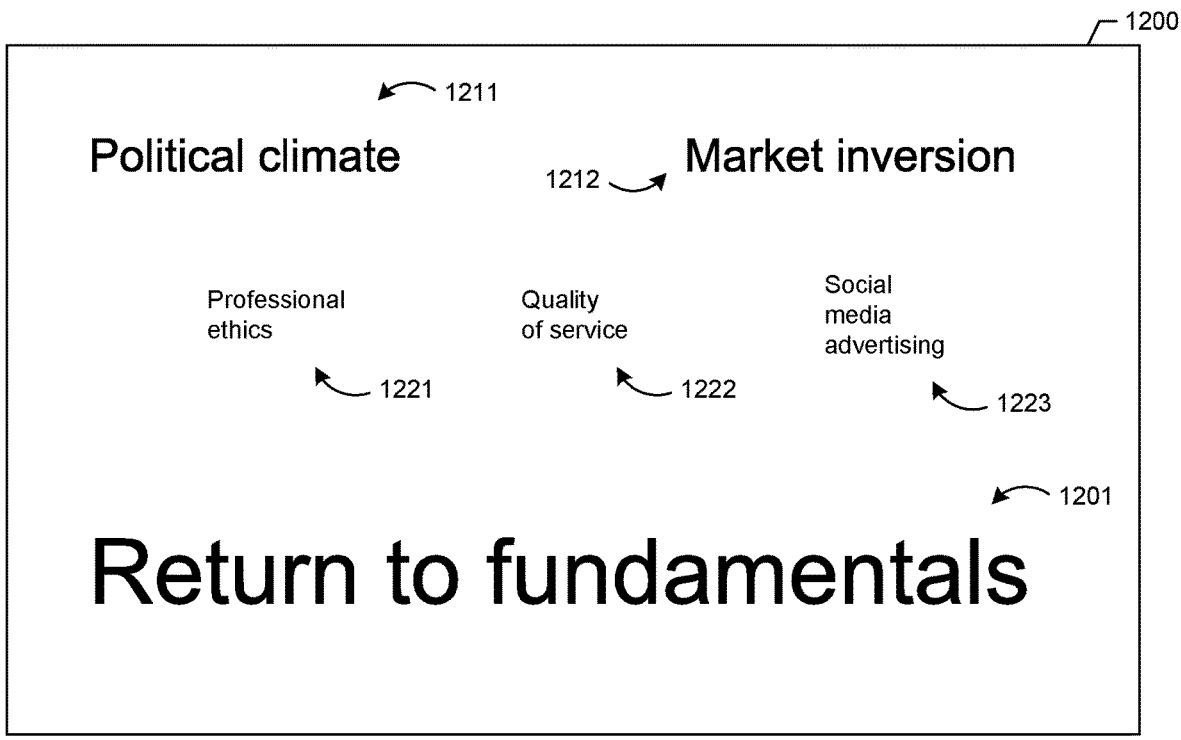
FIG. 12 is a display diagram showing a sample tag cloud report generated by the facility based upon the topic frequency data shown in FIG. 10.

FIG. 6 is a flow diagram showing a process performed by the facility in some embodiments to aggregate the document-related activity of a group of users. In act 601, the facility receives a request identifying a group of users. In various embodiments, the request identifies the group of users in a variety of ways, such as by referring to a group name; providing a list of user names; specifying criteria to be satisfied by each member of the group, such as job titles, project names, credentials, certifications, security clearances, minimum proficiency levels, responsibilities or privileges, etc.; selecting regions and/or individual nodes in an organizational chart; etc. In acts 602-607, the facility loops through each user of the group identified in act 601. In act 603, the facility identifies documents or document portions with which the user has recently interacted, such as by accessing the presence nodes. An example of the results of performing act 603 is shown in FIG. 7 and discussed below. In acts 604-606, the facility loops through each document or document portion identified in act 603. In act 605, the facility identifies topics to which the document or document portion is addressed. In various embodiments, the facility performs this identification by accessing topics already stored with or for that document or document portion; applying automatic natural language understanding techniques; or by various other approaches. An example of the results of performing act 605 is shown in FIGS. 8 and 9 and discussed below. In act 606, if additional identified documents or document portions remain to be processed, than the facility continues in act 604, else the facility continues in act 607. In act 607, if additional users of the group remain to be processed, than the facility continues in act 602, else the facility continues in act 608. In act 608, the facility aggregates the identified topics across the users of the group. In various embodiments, this aggregation involves establishing a union of these topics; determining a frequency of these topics; creating a frequency-ordered list of these topics; creating a frequency-filtered list of these topics; etc. An example of the results of performing act 608 is shown in FIG. 10 and discussed below. In act 609, the facility generates a report that reflects the result of the aggregation performed in act 608. Examples of the results of performing act 609 are shown in FIGS. 11 and 12 and discussed below. In act 610, the facility causes the report generated in act 609 to be displayed or otherwise presented to one or more users. In some embodiments (not shown), the facility persistently stores the report generated in act 609. After act 610, this process concludes.

FIGS. 7-10 show an example of data gathered and aggregated by the facility in accordance with acts 602-608 shown in FIG. 6.

FIG. 7 is a table diagram showing document portions identified as having been recently interacted with by a user of the group by the facility in act 603 shown in FIG. 6. The table 700 is made up of rows, such as rows 711-722, each corresponding to a single document portion with which a particular user of the group has recently interacted. Each row is divided into the following columns: a user column 701 identifying the user who interacted with the document portion; a document column 702 identifying the document in which the portion is included; and a portion column 703 identifying the particular portion of this document with which the user interacted. For example, row 711 indicates that Alice recently interacted with the first slide of the Hartford Presentation.

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

FIG. 8 is a table diagram showing the topics of document portions identified as having been recently interacted with by a user of the group by the facility in act 605 shown in FIG. 6. The table 800 is made up of rows, such as rows 811-822, each corresponding to a unique combination of a single document portion with which one or more users of the group have recently interacted and a topic to which that document portion is addressed. Each row is divided into the following columns: a document column 801 identifying the document; a portion column 802 identifying the particular portion of this document with which users in the group interacted; and a topic column 803. For example, row 811 indicates that the first slide of the Hartford Presentation is addressed to the topic "quality of service," while row 812 indicates that the same slide is also addressed to the topic "market inversion."

FIG. 9 is a table diagram showing the topics of one or more document portions recently interacted with by a user of the group. The table 900 is made up of rows, such as rows 911-921, each corresponding to a unique combination of a user and a topic to which one or more document portions with which the user has recently interacted is addressed. Each row is divided into the following columns: a user column 901 identifying the user; and a topic column 902. For example, row 911 indicates that Alice recently interacted with one or more document portions addressed to the topic "quality of service," while rows 912 and 913 indicate that Alice also recently interacted with one or more documents addressed to the topics "market inversion" and "political climate."

FIG. 10 is a table diagram showing the frequency of topics among users of the group. The table 1000 is made up of rows, such as rows 1011-1016, each corresponding to a unique topic to which any of the document portions with which the users of the group have recently interacted is addressed. Each row is divided into the following columns: a topic column 1001 identifying the topic; and a number of users column 1002 indicating the number of users in the group who recently interacted with a document portion addressed to this topic. For example, row 1011 indicates that four users of the group recently interacted with one or more document portions addressed to the topic "return to fundamentals" (Betty, Cameron, Davina, and Florence, as shown in FIG. 9).

FIGS. 11 and 12 show sample reports generated by the facility in act 609 shown in FIG. 6 based upon the topic frequency data shown in FIG. 10.

FIG. 11 is a display diagram showing a sample histogram report generated by the facility based upon the topic frequency data shown in FIG. 10. The report 1100 includes vertical bars each corresponding to a different topic whose height reflects the number of users in the group who interacted with at least one document or document portion addressed to the topic, such as by being proportional to this number of users. For example, the height of vertical bar 1101 indicates that four users of the group interacted with at least one document or document portion addressed to the topic "return to fundamentals," while the height of vertical bar 1102 indicates that two users of the group—half as many— interacted with at least one document or document portion addressed to the topic "market inversion."

FIG. 12 is a display diagram showing a sample tag cloud report generated by the facility based upon the topic frequency data shown in FIG. 10. The report 1200 includes topic names each rendered in a font size that reflects the number of users in the group who interacted with at least one document or document portion addressed to the topic, such as by being proportional to this number of users. For example, by comparing the font size of topic name 1201 to the font size of topic name 1211, it can be seen that twice as many users of the group interacted with a document or document portion addressed to the topic "return to fundamentals" as interacted with a document or document portion addressed to the topic "political climate."

In some embodiments (not shown), when any of the reports generated by the facility is presented, the user can interact with the report to obtain additional information. For example, in various embodiments, the user can hover over, click on, touch, gaze at, etc. any of the topic names, the graph bars associated with the topics, etc. in order to display a list of the users who interacted with document portions addressed to this topic; a list of these document portions; leading documents or document portions addressed to this topic; etc.

Figure 13:
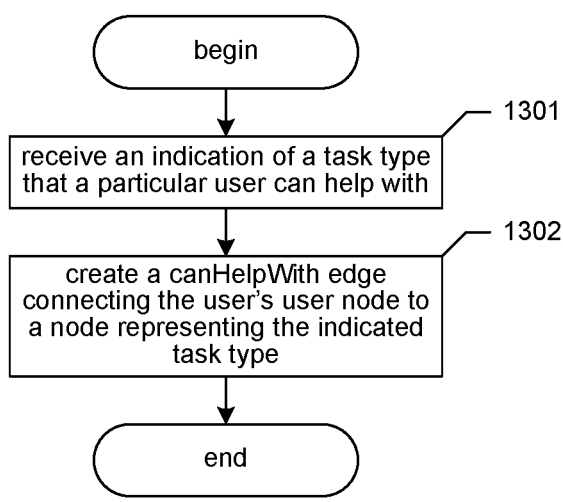
FIG. 13 is a flow diagram showing a process performed by the facility in some embodiments to enable an offering user to identify a type of task with which the offering user can assist.
Figure 17:
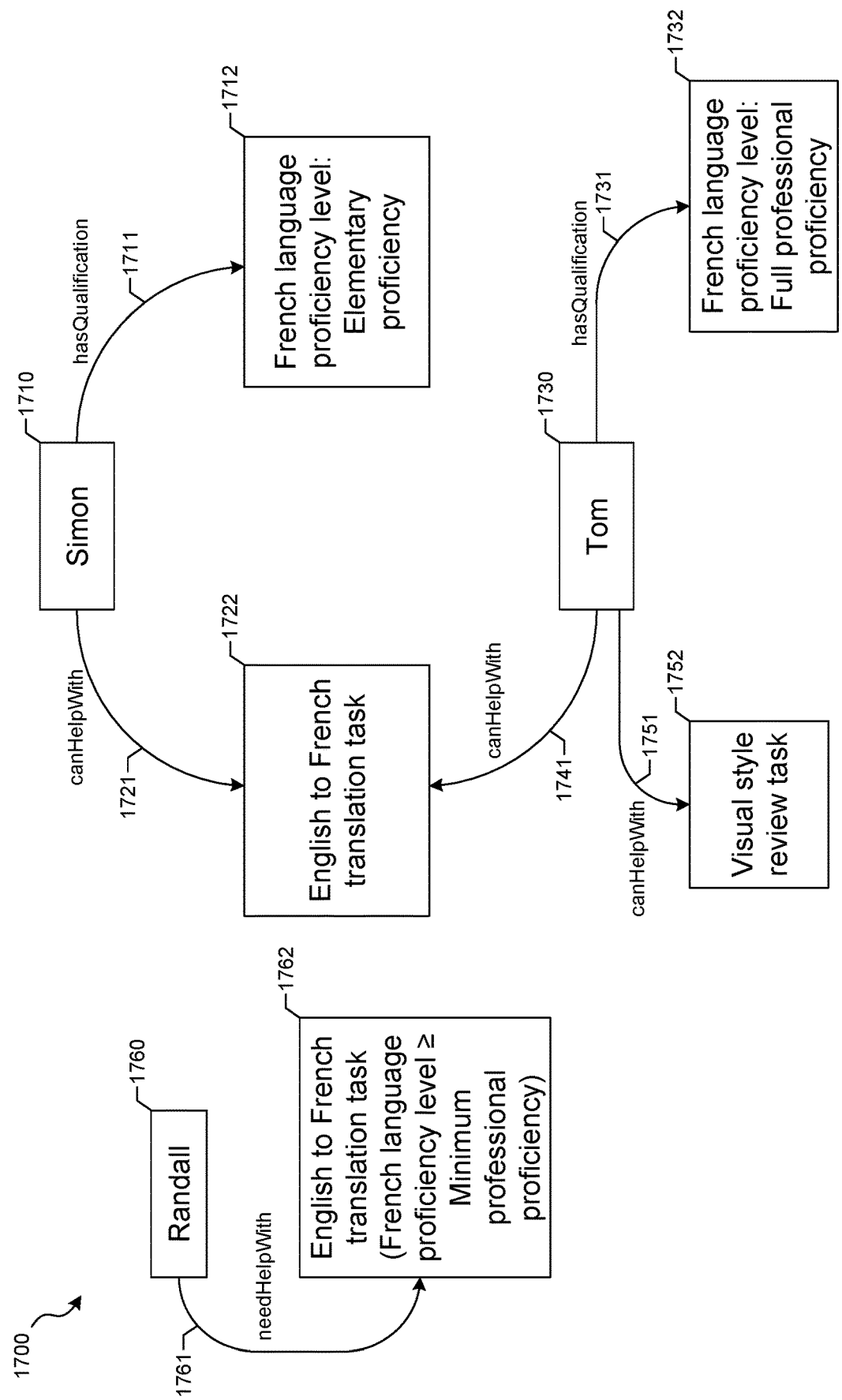
FIG. 17 is a graph diagram showing a sample document graph in which the facility represents offers of task assistance from offering users and requests for task assistance from seeking users.

FIG. 13 is a flow diagram showing a process performed by the facility in some embodiments to enable an offering user to identify a type of task with which the offering user can assist. In act 1301, the facility receives an indication of a task type that an offering user is able and willing to perform. Additional information about act 1301 is shown in FIG. 14 and discussed below. In act 1302, the facility creates a canHelpWith edge that connects the user node representing the offering user to a node representing the indicated task type. Additional information about act 1302 is shown in FIG. 17 and discussed below. After act 1302, this process concludes.

FIG. 14 is a display diagram showing a sample display presented by the facility in some embodiments to enable an offering user to offer assistance with a particular type of task. The display 1400 includes a section 1410 in which the user can select a task type with which to offer assistance. It can be seen that, among the task types "English to French translation" 1411, "visual style review" 1412, and "create transitions between slides" 1413, the user has selected the radio button for the first. The user further activates submit control 1420 in order to offer assistance with this task type.

Figure 15:
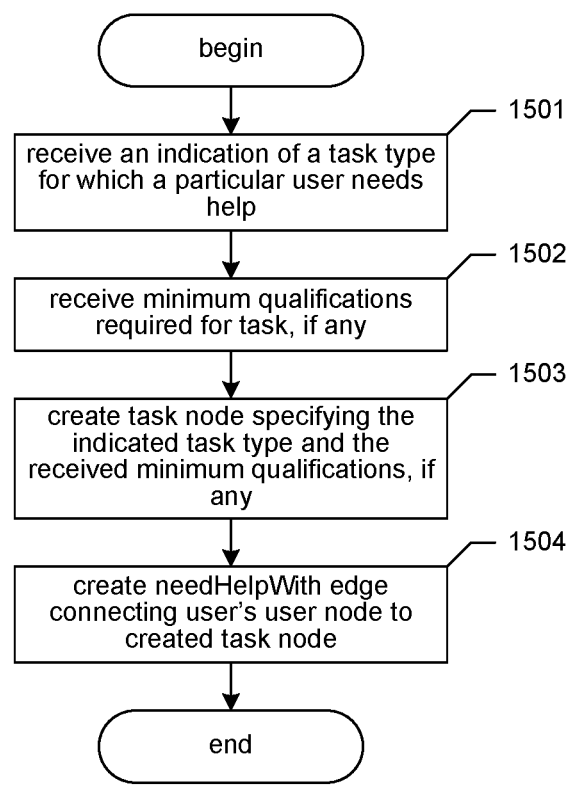
FIG. 15 is a flow diagram showing a process performed by the facility in some embodiments to enable a seeking user to identify a task with which the seeking user seeks assistance.

FIG. 15 is a flow diagram showing a process performed by the facility in some embodiments to enable a seeking user to identify a task with which the seeking user seeks assistance. In act 1501, the facility receives an indication of a task type for which a seeking user needs help. In act 1502, the facility receives minimum qualifications required for a task, if any. Additional information about acts 1501 and 1502 is shown in FIG. 16 and discussed below. In act 1503, the facility creates a task node that specifies the task type indicated by the indication received in act 1501 and the minimum qualifications received in act 1502, if any. In act 1504, the facility creates a needHelpWith hedge that connects the user node representing the seeking user to the task node created in act 1503. Additional information about acts 1503 and 1504 is shown in FIG. 17 and discussed below.

FIG. 16 is a display diagram showing a sample display presented by the facility in some embodiments to enable a seeking user to seek assistance with a particular task. The display 1600 includes a first section 1610 in which the user can select a task type for which to seek assistance. It can be seen that, among the task types "English to French translation" 1611, "visual style review" 1612, and "create transitions between slides" 1613, the user has selected the radio button for the first. The display also includes a second section 1620 in which the user can select minimum qualifications for the task. In some embodiments, as shown, the minimum qualification options shown in the second section are responsive to the task type selected by the user in the first section—that is, here, the minimum qualification options shown in second section relate to the "English to French translation" task type selected in the first section. It can be seen that, of the five French language proficiency levels shown in qualification options 1621-1625, the user has selected the middle one, "minimum professional proficiency in French language." In some embodiments (not shown), the facility further obtains information from the seeking user further defining the task, such as information identifying starting materials for the task, instructions for completing the task, etc. The user further activates submit control 1630 in order to seek assistance with this task.

FIG. 17 is a graph diagram showing a sample document graph in which the facility represents offers of task assistance from offering users and requests for task assistance from seeking users. In the graph 1700, in response to a request for task assistance from Randall, the facility has created new task node 1762 identifying the "English to French translation" task type and a minimum qualification specified by Randall, a proficiency level in the French language at least as high as "minimum professional proficiency." The facility has further connected Randall's user node 1760 to the new task node 1762 with a needHelpWith edge 1761.

At the time task node 1762 and edge 1761 are added, the graph contains three canHelpWith edges: 1721, 1741, and 1751. The facility seeks to match at least one of these three canHelpWith edges with new needHelpWith edge 1761.

Figure 18:
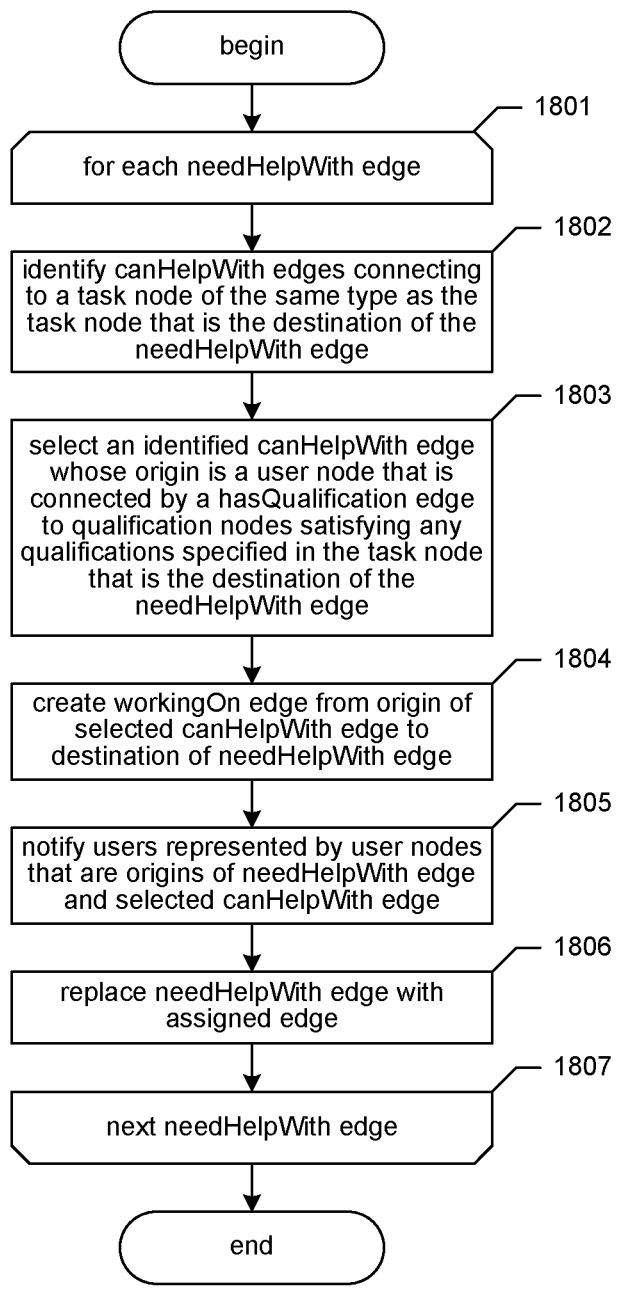
FIG. 18 is a flow diagram showing a process performed by the facility in some embodiments to match needHelpWith edges to canHelpWith edges
Figure 19:
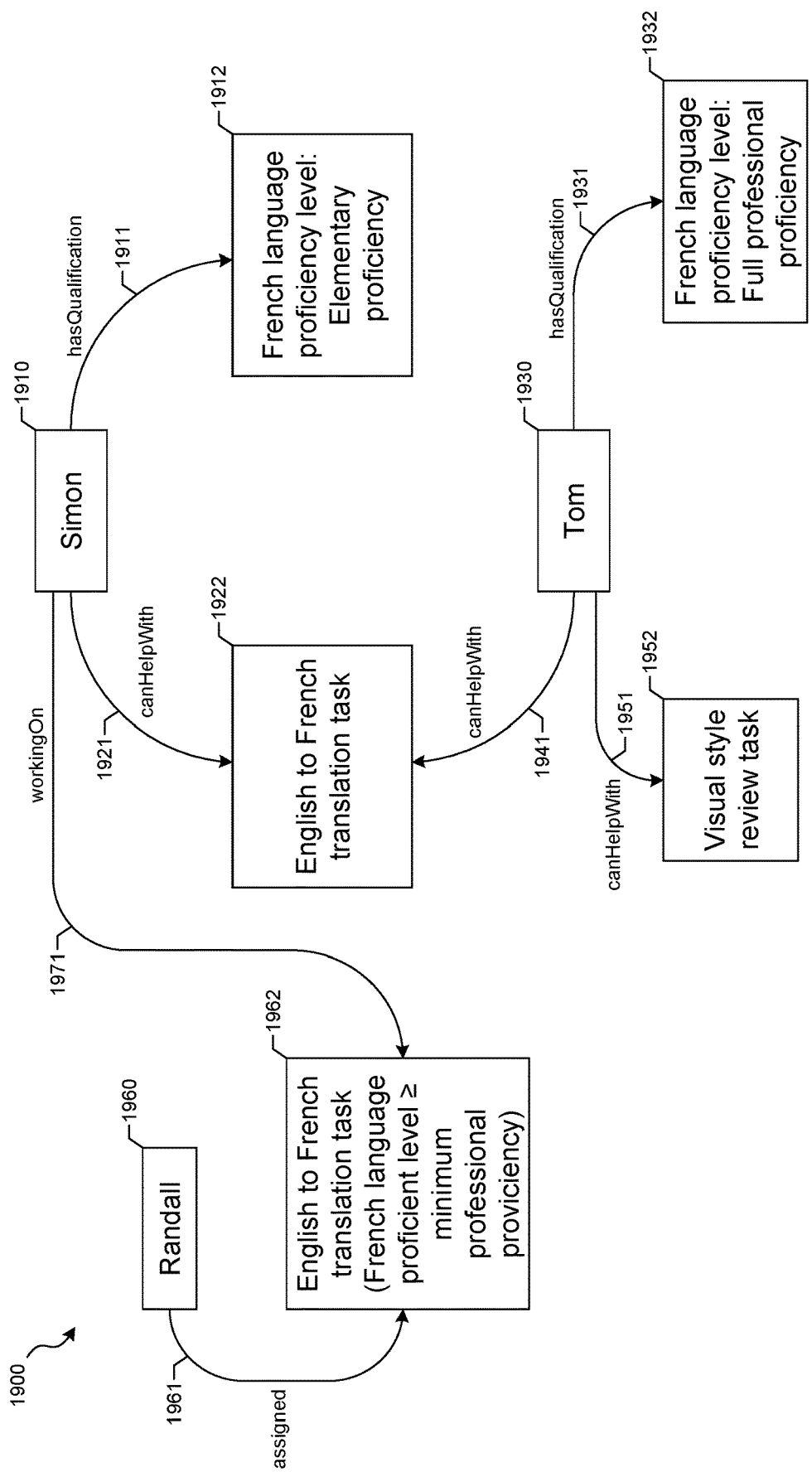
FIG. 19 is a graph diagram showing a sample document graph in which the facility has matched an offer of task assistance from an offering user with a request for task assistance from a seeking user.

FIG. 18 is a flow diagram showing a process performed by the facility in some embodiments to match needHelpWith edges to canHelpWith edges. In acts 1801-1807, the facility loops through each needHelpWith edge that exists in the document graph. In act 1802, the facility identifies all of the canHelpWith edges that enter a task type node that is of the same type as the task node is entered by the client needHelpWith edge. In the example shown in FIG. 17, of the three canHelpWith edges 1721, 1741, and 1751, the facility identifies canHelpWith edges 1721 and 1741, as they both enter task type node 1722 which has the "English to French translation" task type that matches task node 1762. In act 1803, the facility selects one of the canHelpWith edges identified in act 1802 that exits the user node is connected by a hasQualification edge to one or more qualification nodes satisfying any qualifications specified in the task node. In the example shown in FIG. 17, the facility selects canHelpWith edge 1741, as it exits a user node 1730 that is also exited by a hasQualification edge 1731 that enters a qualification node 1732 specifying a French language proficiency level that satisfies the qualification specified in task node 1762—the French language proficiency level specified by qualification node 1732, "Full professional proficiency," exceeds the French minimum language proficiency level specified in task node 1762, "minimum professional proficiency." This is in contrast with canHelpWlth edge 1721, which exits a user node 1710 that is also exited by a hasQualification edge 1711 that enters a qualification node 1712 specifying a French language proficiency level that does not satisfy the qualification specified in task node 1762—the French language proficiency level specified by qualification node 1712, "Elementary proficiency," falls short of the French minimum language proficiency level specified in task node 1762, "minimum professional proficiency." In act 1804, the facility creates a workingOn edge from the user node exited by the selected canHelpWith edge to the task node. In act 1805, the facility notifies the users who are represented by the user nodes that are exited by the current needHelpWith edge and the selected canHelpWith edge that the user whose user node is exited by the selected canHelpWith edge will perform the project. In act 1806, the facility replaces the current needHelpWith edge with an assigned edge connoting that the seeking user has assigned the task represented by the task node formerly entered by the needHelpWith edge. Additional information about acts 1804 and 1806 is shown in FIG. 19 and discussed below. In act 1807, if additional needHelpWith edges remain in the document graph, the facility continues in act 1801 to process the next needHelpWith edge, else this process concludes.

FIG. 19 is a graph diagram showing a sample document graph in which the facility has matched an offer of task assistance from an offering user with a request for task assistance from a seeking user. By comparing graph 1900 in FIG. 19 with graph 1700 in FIG. 17, it can be seen that the facility has, in act 1804, created a workingEdge 1971 from user node 1910 representing Simon, selected to perform the English to French translation task represented by task node 1962, to that task node. It can also be seen that the facility has, in act 1806, replaced needHelpWith edge 1761 shown in FIG. 17 with assigned edge 1961 shown in FIG. 19.

In some embodiments, the facility provides one or more instances of computer-readable media collectively storing a document graph data structure, the data structure comprising: a first node of a first type containing identity information about a first user; a second node of a second type containing information about the status of the first user's interaction with documents; and an edge of a third type connecting the second node to the first node, the edge of the third type connoting that the second node contains information about the status of the interaction with documents by the user whose identifying information is contained by the first node, such that the data structure is usable to (a) enable a second user to subscribe to information about the status of the first user's interaction with documents by accessing the first node and (b) enabling servicing of the subscription by following the first edge from the first node to the second node and examine the second node for edges connecting to the second node that connote interactions with documents.

In some embodiments, the facility provides a hardware networking device conveying a document graph data structure, the data structure comprising: a first node of a first type containing identity information about a first user; a second node of a second type containing information about the status of the first user's interaction with documents; and an edge of a third type connecting the second node to the first node, the edge of the third type connoting that the second node contains information about the status of the interaction with documents by the user whose identifying information is contained by the first node, such that the data structure is usable to (a) enable a second user to subscribe to information about the status of the first user's interaction with documents by accessing the first node and (b) enabling servicing of the subscription by following the first edge from the first node to the second node and examine the second node for edges connecting to the second node that connote interactions with documents.

In some embodiments, the facility provides a method in a computing system for reporting on user activity, the method comprising: receiving a request identifying a group of users; for each user of the group, accessing a document-interaction presence entity for the user to identify documents recently interacted with by the user; for each of the identified documents, determining a set of topics to which the document is addressed; determining, for each of the determined set of topics, the number of users of the group who interacted with a document addressed to the topic; and generating a report reflecting, for least a portion of the determined set of topics, the determined number of users of the group who interacted with a document addressed to the topic.

In some embodiments, the facility provides one or more instances of computer-readable media collectively having contents configured to cause a computing system to perform a method for reporting on user activity, the method comprising: receiving a request identifying a group of users; for each user of the group, accessing a document-interaction presence entity for the user to identify documents recently interacted with by the user; for each of the identified documents, determining a set of topics to which the document is addressed; determining, for each of the determined set of topics, the number of users of the group who interacted with a document addressed to the topic; and generating a report reflecting, for least a portion of the determined set of topics, the determined number of users of the group who interacted with a document addressed to the topic.

In some embodiments, the facility provides an apparatus for reporting on user activity, comprising: a processor; and a memory having contents that, when executed by the processor, perform a method, the method comprising: receiving a request identifying a group of users; for each user of the group, accessing a document-interaction presence entity for the user to identify documents recently interacted with by the user; for each of the identified documents, determining a set of topics to which the document is addressed; determining, for each of the determined set of topics, the number of users of the group who interacted with a document addressed to the topic; and generating a report reflecting, for least a portion of the determined set of topics, the determined number of users of the group who interacted with a document addressed to the topic.

In some embodiments, the facility provides one or more instances of computer-readable media collectively having contents configured to cause a computing system to perform a method for matching providers and consumers of a document-related services, the method comprising: receiving an indication from a first user that the first user needs a service of a first service type performed; in response to receiving the indication, selecting user nodes in a document graph each representing a user that (1) are each connected to a task node representing a task type by an edge of a first type, each edge of the first type connoting that the user represented by the user node connected by the edge of the first type is available to perform tasks of the type represented by the task node connected by the edge of the first type, where (2) the task type represented by the task node matches the first service type; and identifying the users represented by the selected user nodes as candidates to perform a service of the first service type for the first user.

In some embodiments, the facility provides a method in a computing system for matching providers and consumers of a document-related services, the method comprising: receiving an indication from a first user that the first user needs a service of a first service type performed; in response to receiving the indication, selecting user nodes in a document graph each representing a user that (1) are each connected to a task node representing a task type by an edge of a first type, each edge of the first type connoting that the user represented by the user node connected by the edge of the first type is available to perform tasks of the type represented by the task node connected by the edge of the first type, where (2) the task type represented by the task node matches the first service type; and identifying the users represented by the selected user nodes as candidates to perform a service of the first service type for the first user.

In some embodiments, the facility provides an apparatus matching providers and consumers of a document-related services, comprising: a processor; and a memory having contents that, when executed by the processor, perform a method, the method comprising: receiving an indication from a first user that the first user needs a service of a first service type performed; in response to receiving the indication, selecting user nodes in a document graph each representing a user that (1) are each connected to a task node representing a task type by an edge of a first type, each edge of the first type connoting that the user represented by the user node connected by the edge of the first type is available to perform tasks of the type represented by the task node connected by the edge of the first type, where (2) the task type represented by the task node matches the first service type; and identifying the users represented by the selected user nodes as candidates to perform a service of the first service type for the first user.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for reporting on user activity, the method comprising:
   receiving a request for a report, the request identifying a group of users and a time range;
   in response to receiving the request,
     for each user of the group of users, identifying, with a processor, one or more documents interacted with by the user during the identified time range;
     for each of the identified one or more documents, determining, with an automatic natural language understanding technique, with the processor, one or more topics to which the document is addressed;
     determining, with the processor, one or more unique combinations of a user of the group of users and a topic of the determined one or more topics that are addressed in each of the identified one or more documents;
     determining, with the processor, for each unique topic of the determined one or more topics, a number of users of the group of users who interacted with a document addressed to the unique topic based on a number of the one or more unique combinations;
     generating, with the processor, the report, wherein the report includes, for at least two unique topics included in the determined one or more unique topics, the number of users of the group of users who interacted with a document addressed to each of the at least two unique topics;
   receiving a first user input selecting a visual indication of a unique topic included in the generated report; and
   in response to receiving the first user input, displaying, via a graphical user interface, a visual indication of one or more documents addressed to the unique topic.

2. The method of claim 1, further comprising storing the generated report.

3. The method of claim 1, further comprising displaying the generated report.

4. The method of claim 1, further comprising:
   receiving second user input selecting a displayed visual indication of a distinguished document; and
   in response to receiving the second user input, causing to be displayed at least a portion of the contents of the distinguished document.

5. The method of claim 1 wherein the received request identifies a group of users by specifying a group name, specifying user attributes required for membership in the group, or specifying a user-selected region of an organizational chart.

* * * * *